(12) United States Patent
Fairy et al.

(10) Patent No.: US 7,850,442 B2
(45) Date of Patent: Dec. 14, 2010

(54) EDGE-GATED NOZZLE

(75) Inventors: Fabrice Fairy, Georgetown (CA);
Hitesh Kaushal, Brampton (CA);
Douglas Ursu, Orangeville (CA)

(73) Assignee: Mold-Masters (2007) Limited,
Georgetown, Ontario (CA)

( * ) Notice: Subject to any disclaimer, the term of this patent is extended or adjusted under 35 U.S.C. 154(b) by 177 days.

(21) Appl. No.: 12/142,901

(22) Filed: Jun. 20, 2008

(65) Prior Publication Data

US 2008/0317898 A1   Dec. 25, 2008

Related U.S. Application Data

(60) Provisional application No. 60/945,272, filed on Jun. 20, 2007, provisional application No. 60/956,627, filed on Aug. 17, 2007.

(51) Int. Cl.
*B29C 45/23* (2006.01)
(52) U.S. Cl. .................... 425/564; 425/573
(58) Field of Classification Search ............... 425/564, 425/565, 566, 573
See application file for complete search history.

(56) References Cited

U.S. PATENT DOCUMENTS

| | | | |
|---|---|---|---|
| 3,933,312 | A | 1/1976 | Fries |
| 4,595,552 | A | 6/1986 | Hahn |
| 5,104,307 | A | 4/1992 | van den Brink |
| 7,014,455 | B2 | 3/2006 | Olaru |
| 7,172,411 | B2 | 2/2007 | Fairy |
| 7,322,817 | B2 | 1/2008 | Manner |
| 7,658,605 | B2 * | 2/2010 | Fairy .................... 425/564 |
| 2004/0009259 | A1 | 1/2004 | Manner |
| 2009/0074906 | A1 | 3/2009 | Braun |

FOREIGN PATENT DOCUMENTS

CN   1616208 A   5/2005

(Continued)

OTHER PUBLICATIONS

Paper, "Mould Construction" of EWIKON Heisskanalsysteme GmbH & Co. KG, one page. Original paper is in German but English translation is attached.
Brochure "Hotline Feb. 2006" of EWIKON Heisskanalsysteme GmbH & Co. KG, 2 pages, Oct. 2006 (no English translation).

(Continued)

*Primary Examiner*—Tim Heitbrink
(74) *Attorney, Agent, or Firm*—Medler Ferro PLLC

(57) ABSTRACT

An injection molding apparatus includes a manifold having a manifold melt channel for receiving a melt stream of moldable material under pressure and at least one nozzle having a nozzle melt channel in fluid communication with the manifold melt channel. The nozzle has an opening that intersects with the nozzle melt channel, the opening having a central axis that is at an angle with respect to a central axis of the nozzle. A nozzle tip is coupled to the nozzle at one end of the opening. A valve pin bushing is coupled to the nozzle at an end of the opening opposite the nozzle tip. A valve pin extends through the opening. A primary actuator is connected to the valve pin. A nozzle locator piece is connected to the nozzle for mating with a side plate to locate the nozzle with respect to the mold gate.

20 Claims, 12 Drawing Sheets

FOREIGN PATENT DOCUMENTS

| | | |
|---|---|---|
| DE | 19742099 A1 | 4/1998 |
| DE | 202006012676 U1 | 9/2007 |
| EP | 0447573 A1 | 3/1990 |
| JP | 59159326 A | 9/1984 |
| JP | 2002283409 A | 10/2002 |
| JP | 2002283410 A | 10/2002 |

OTHER PUBLICATIONS

Brochure "Plast Verarbeiter" of EWIKON Heisskanalsysteme GmbH & Co. KG, 2 pages. (no English translation).

First Office Action from State Intellectual Property Office, P.R. China, Application No. 200810125195.7, dated Aug. 26, 2010.

* cited by examiner

EDGE-GATED NOZZLE

RELATED APPLICATIONS

This application claims the benefit of and priority to U.S. provisional patent application No. 60/945,272 filed Jun. 20, 2007, and U.S. provisional patent application No. 60/956,627 filed Aug. 17, 2007, both of which are incorporated herein by reference.

FIELD OF THE INVENTION

The present invention relates generally to an injection molding apparatus and, in particular, to an edge-gated apparatus with a mechanical actuated shut-off.

BACKGROUND OF THE INVENTION

Edge gating is well known in the art of injection molding and generally refers to a process for molding a part in which the mold gate is located at an edge or a side of a mold cavity, rather than at the center thereof. In general, the axis along which melt flows into the mold cavities in an edge gating system is at an angle to the main axis of the nozzle. Edge gating is typically used in applications where part geometry dictates that the gate cannot be located at the center of the part or in applications where it is desirable to hide the vestige left by the mold gate on the part.

Hot runner nozzles for edge gating applications using mechanical means to open and close a mold gate, such as a movable valve pin, rather than thermal means are also known. Valve gated nozzles are presumed to provide a better control of the flow of material through the mold gate. However, there is still a need in the art for improved valve gated edge gated nozzles.

SUMMARY OF THE INVENTION

According to one aspect of the invention, an injection molding apparatus includes a manifold having a manifold melt channel for receiving a melt stream of moldable material under pressure and at least one nozzle having a nozzle melt channel in fluid communication with the manifold melt channel for receiving the melt stream from the manifold. The nozzle has an opening that intersects with the nozzle melt channel, the opening having a central axis that is at an angle with respect to a central axis of the nozzle. A nozzle tip is coupled to the nozzle at one end of the opening. A valve pin bushing is coupled to the nozzle at an end of the opening opposite the nozzle tip. A valve pin extends through the opening and is slidable within the valve pin bushing to open and close a mold gate. A primary actuator is connected to the valve pin to open and close the mold gate. A nozzle locator piece is connected to the nozzle for mating with a side plate to locate the nozzle with respect to the mold gate.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENT(S)

Figure 1:
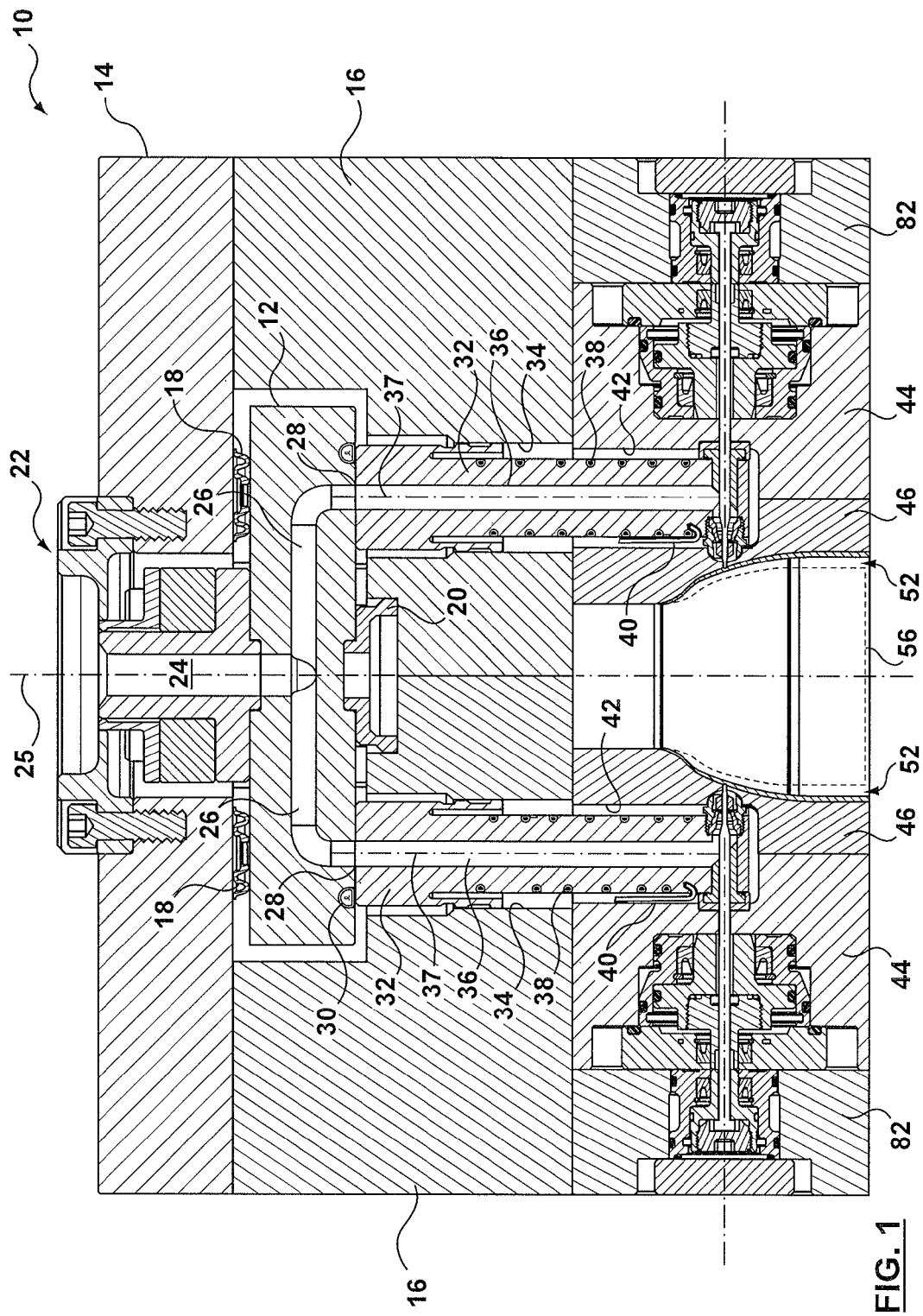
FIG. 1 is a partial cross-sectional view of a portion of an injection molding apparatus according to one embodiment of the present invention.

Referring to the drawings, there is shown in FIG. 1 a portion of an injection molding apparatus 10 according to one embodiment of the present invention. The injection molding apparatus 10 includes a manifold 12 which is spaced between a back plate 14 and mold plates 16. In the present embodiment, the manifold 12 is located relative to mold plates 16 by a locating ring 20, and is spaced apart from the back plate 14 by means of pressure disks 18. Therefore, the manifold 12 is said to be floating, as will be described in further detail below.

A sprue bushing 22 receives a melt stream of moldable material from a machine nozzle (not shown) and delivers the melt through inlet 24, having a central axis 25, to a manifold melt channel 26. The melt travels through the melt channel 26 and exits the manifold 12 through manifold outlets 28. The manifold 12 is heated by a manifold heater 30, such as an electrically resistive wire heater, which communicates with a power source (not shown) through electrical connectors (not shown).

Hot runner nozzles include nozzle bodies 32 received in respective wells 34 in mold plates 16. While two nozzle bodies 32 are shown, it will be understood that the injection molding apparatus 10 can be adapted so as to accommodate as many or as few nozzle bodies 32 as desired, depending on the particular application. A nozzle melt channel 36 extends through each nozzle body 32 and is in communication with the manifold outlet 28 to receive the melt. Nozzle melt channels 36 each have a central axis 37 substantially parallel to the axis 25 of the inlet 24 of the sprue bushing 22. Nozzle bodies 32 are heated by nozzle heaters 38, which can be electrically resistive wire heaters, which communicate with a power source (not shown) through electrical connectors (not shown). The nozzle heaters 38 are shown as being heating elements embedded in an outer surface of the nozzle body 32, however, any other suitable type of nozzle heater may be used. Each nozzle 32 further includes a thermocouple 40 which provides temperature measurements of the nozzle 32 or the melt therein.

The nozzle bodies 32 extend beyond mold plates 16 and are received in corresponding wells 42 formed by the mating of side plates 44 with cavity plates 46. Each cavity plate 46 has an inner surface 48 which defines an outer surface of mold cavity 52, and an outer surface 54 which defines part of the well 42 for receiving the nozzle body 32. A cavity insert 56 (shown in hidden lines) defines the inner surface of mold cavity 52. At the beginning of a molding cycle, the cavity insert 56 is positioned in the opening defined by the inner surface 48 of the cavity plates 46; therefore, during an injection molding operation, a part is formed in the gap or cavity 52 formed between the inner surface 48 of cavity plate 46 and the outer surface of cavity insert 56. While one cavity insert 56 is shown, it will be understood, that one or more parts may be formed at the same time depending upon the design of the cavity insert(s) and cavity plates 46. That is, cavity inserts and plates of any number and design can be used to define mold cavities of any number and shape.

In addition to having a portion that forms part of the wells 42 for the nozzle bodies 32, the outer surface 54 of each cavity plate 46 also has a portion which abuts against a corresponding inner surface of side plates 44. Side plates 44 and cavity plates 46 each have a rear end surface which abut against a corresponding end surface of mold plates 16 in such a manner so that the wells 34 of the mold plates 16 align with the wells 42 formed by the side plates 44 and cavity plates 46.

Figure 3:
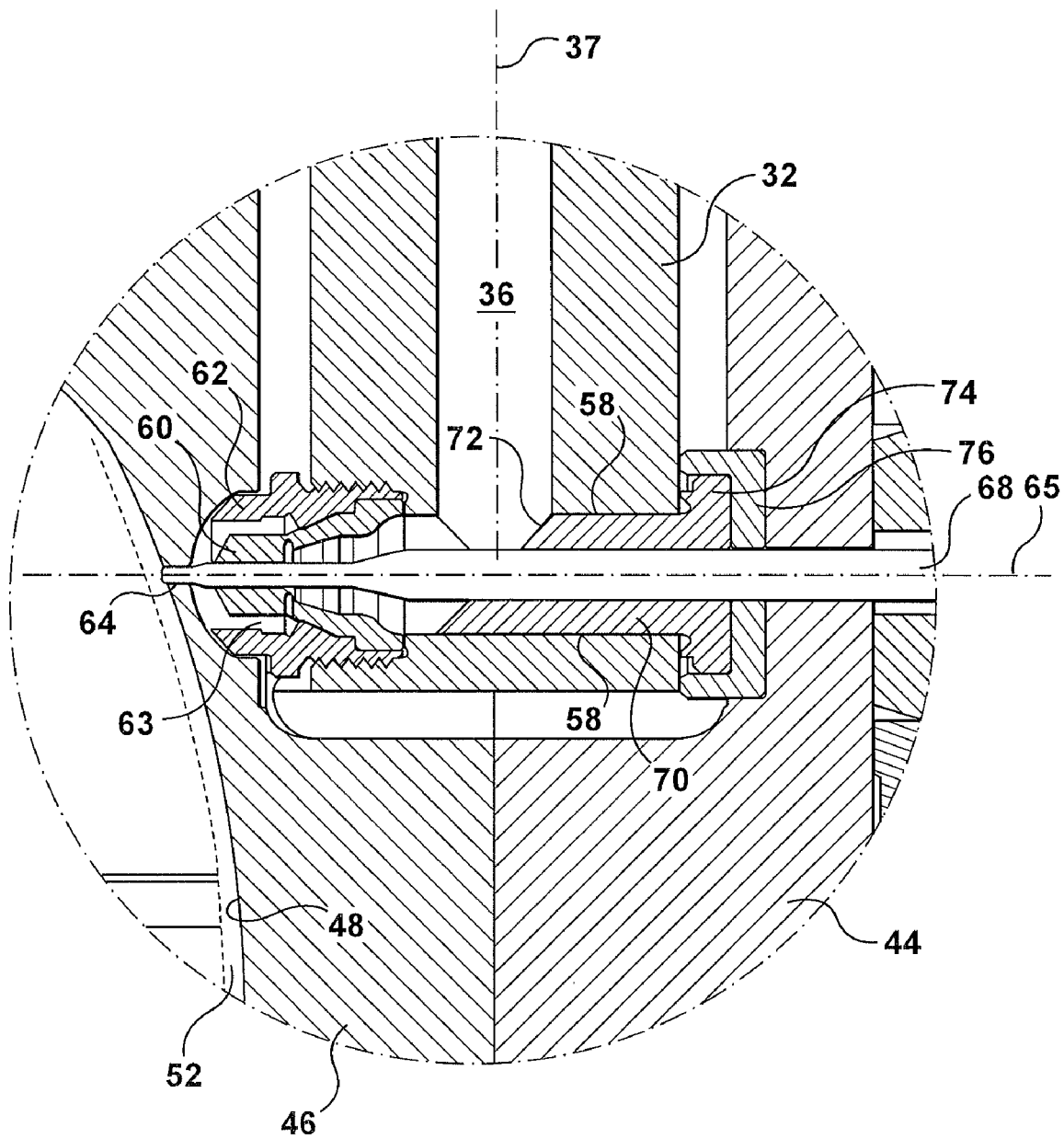
FIG. 3 is an enlarged view of a portion of FIG. 2.
Figure 5:
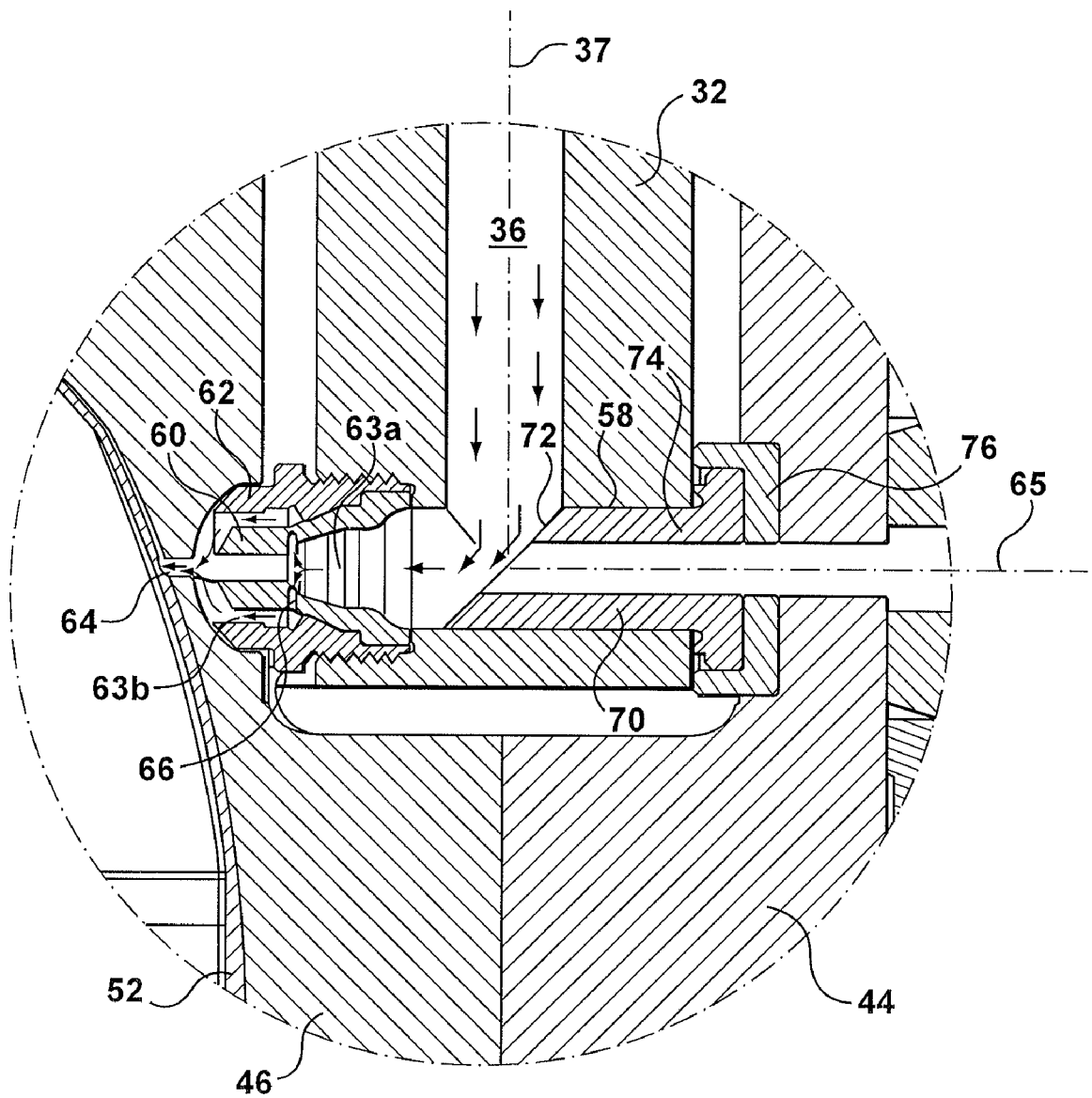
FIG. 5 is similar to the view shown in FIG. 3 with the valve pin being removed.

As shown more clearly in FIGS. 3 and 5, a downstream end of each nozzle body 32 is formed with a transverse opening 58 therethrough which intersects the nozzle melt channel 36. A nozzle tip 60 and transfer seal or tip retainer 62, which includes a seal, are coupled to one end of the transverse opening 58 of the nozzle body 32. In this embodiment, the tip retainer 62 removably secures the tip 60 to the nozzle body 32 and aligns the tip 60 with respect to a mold gate 64. The nozzle tip 60 has a first melt channel portion 63a through the centre of the nozzle tip 60. The first melt channel portion 63a feeds second melt channel portion 63b formed in the annular space between the outer surface of nozzle tip 60 and the inner surface of tip retainer 62 through lateral outlet ports 66 formed in the nozzle tip 60. The second melt channel portion 63b leads to and is in fluid communication with the mold gate 64 that is formed in cavity plate 46. The flow of the melt from nozzle melt channel 36 through to the mold gate 64 is shown with directional arrows in FIG. 5. The transverse opening 58 has a central axis 65 extending through the transverse opening 58 to the mold gate 64, the axis 65 being substantially perpendicular to the central axis 37 of the nozzle melt channel 36. As the mold gate 64 is oriented essentially perpendicular to the flow of melt through the nozzle melt channel 36, this set-up is commonly referred to as an edge gate. The nozzle tip 60 and tip retainer 62 may be coupled to the transverse opening 58 in the nozzle body 32 by any suitable method such as by means of a threaded connection (as shown), or by brazing or soldering in other embodiments, for example. As well, while a two-part tip assembly (i.e. nozzle tip 60 and tip retainer 62) has been shown, it will be understood that any suitable tip assembly, such as a one-piece nozzle tip may be used, as desired.

A valve pin 68 extends through the transverse opening 58 of the nozzle body 32 to the mold gate 64. The forward end of valve pin 68 extends through the nozzle tip 60 and tip retainer 62 to the mold gate 64. Depending upon the application or desired configuration, the tip of the valve pin 68 may be cylindrical or tapered.

Each valve pin 68 is slidable through a valve disk or valve pin bushing 70 located in the end of the transverse opening 58 opposite to the nozzle tip 60. The valve pin bushing 70 is formed with an angled end portion 72 which sits within the transverse opening 58 at the intersection with the nozzle melt channel 36 so as to provide a smooth transition as the melt flows from the nozzle melt channel 36 along axis 37 to the nozzle tip 60 and mold gate 64 along axis 65. The opposite end of the valve pin bushing 70 is formed with a head portion 74 which abuts against the outside surface of the nozzle body 32 and locates the valve pin bushing 70 in the transverse opening 58. A nozzle locator piece 76 is positioned on the head portion 74 of the valve pin bushing 70. The nozzle locator piece 76 is received in a corresponding opening formed in the side plate 44 thereby working in conjunction with the tip retainer 42 to locate the nozzle body 32 with respect to side plates 44. The interconnection of locating diameters between the tip retainer 62 with the cavity plate 46, and the interconnection of locating diameters between the nozzle locator piece 76 and the side plate 44 ensure that the nozzle body 32 is held in place. Therefore, any thermal expansion of the nozzle body 32 due to the heating of the nozzle body 32 occurs in the direction of the central axis 37 of the nozzle melt channel 36 towards the sprue bushing 22. Thermal expansion of the nozzle body 32 in this direction is permitted as a result of the pressure disks 18. As the nozzle body 32 expands upwards along axis 37, the manifold 12 compresses pressure disks 18 against back plate 14. When the nozzle body 32 cools, the pressure disks expand to their rest position and press the manifold 12 downwards against the rear ends of nozzle bodies 32.

Figure 2:
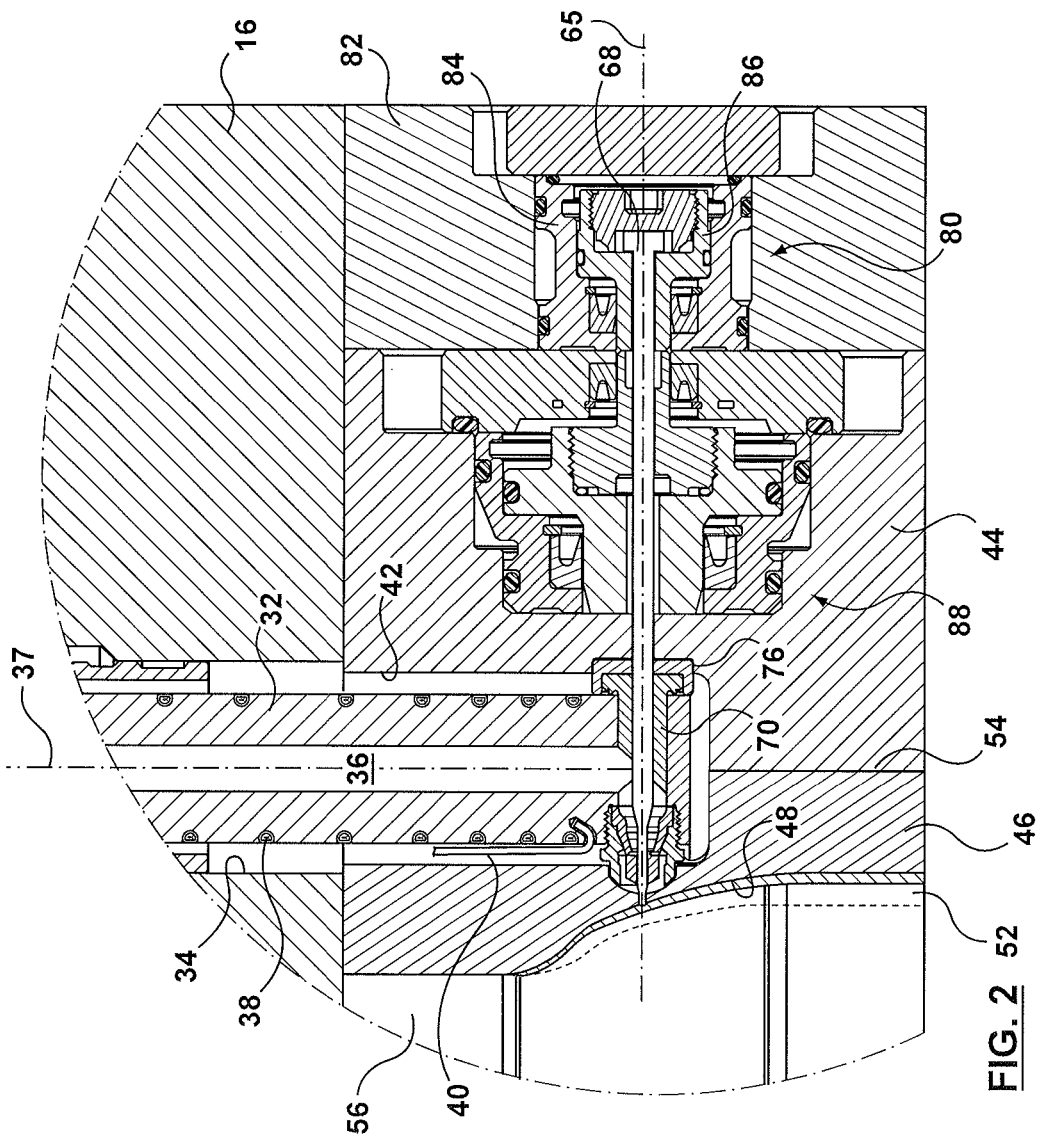
FIG. 2 is an enlarged view of a portion of FIG. 1.
Figure 4:
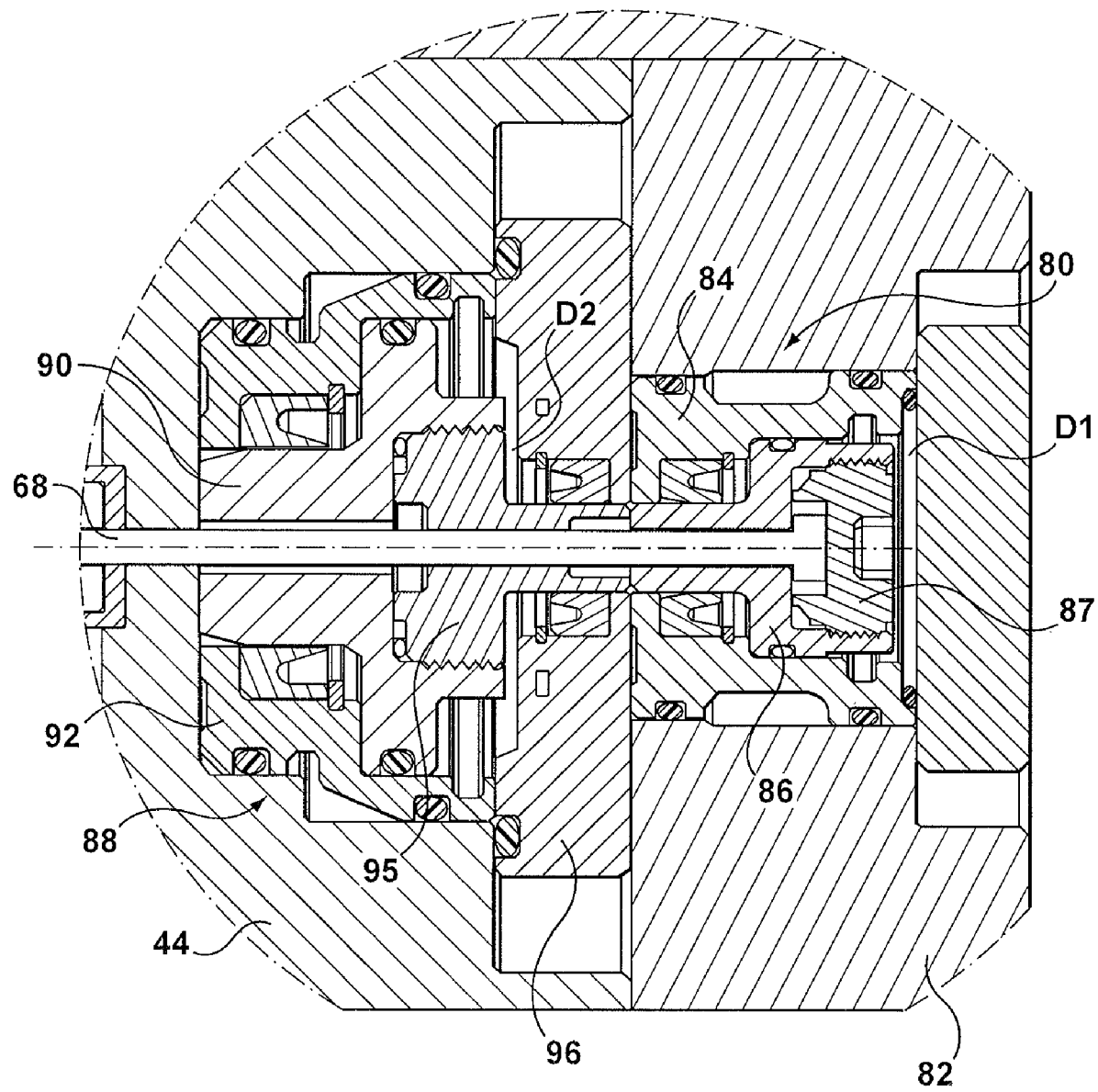
FIG. 4 is an enlarged view of a portion of FIG. 2.

The valve pin 68 extends outwardly away from the transverse opening 58 in the nozzle body 32 along axis 65. The valve pin 68 is operated by a primary or main actuator 80 located in an actuator plate 82 positioned adjacent to side plate 44 (see FIGS. 2 and 4). In the subject embodiment, actuator 80 is comprised of a cylinder 84 and piston 86 arrangement. Piston 86 has a main body portion which engages the outermost end of valve pin 68. A piston cap 87 further secures the piston body 86 to the head of the valve pin 68. The piston 86 is slidable along axis 65 within cylinder 84 as a clearance distance D1 is provided between the end of the piston cap 87 and the end of the cylinder 84 within the opening provided in actuator plate 80. The main actuator 82 moves the valve pin 68 between a fully closed position, as shown in FIG. 3, wherein the forward-most end of the valve pin 68 extends through the mold gate 64 thereby closing or shutting-off the nozzle melt channel 36 and the tip melt channel 63a, 63b, and a fully retracted position wherein melt is free to flow from the nozzle melt channel 36, past the valve pin bushing 70 into the tip melt channel 63a, 63b, and through the mold gate 64 into the mold cavity 52.

In some instances, as shown in the subject embodiment, a secondary actuator 88 is provided intermediate the main actuator 80 and the valve pin bushing 70, the secondary actuator 88 being received in side plate 44. As with the main actuator 82, the secondary actuator 88 is comprised of a piston 90 and cylinder 92 arrangement. The piston 90 has a piston cap 95 that can contact and move the piston 86 of the main actuator 82. The secondary actuator 88 serves to move the valve pin 68 from the fully closed position to an intermediate closed position wherein the forward-most end of the valve pin 68 is slightly retracted out of the mold gate 64 while still serving to close or shut-off the melt channels 36, 63a/63b. The valve pin 68 is movable between the fully closed position and the intermediate closed position as a clearance distance D2 is provided between the piston 90 and cylinder back plate 96. It will be understood that clearance distance D2 is smaller than clearance distance D1, as clearance distance D2 only provides for the valve pin 68 to be just slightly retracted out of the fully closed position. For example, the secondary actuator 88 may only retract the valve pin a distance of about 0.3 mm to 0.4 mm. By slightly retracting the valve pin 68 out of the mold gate 64 prior to the mold being opened, any interference between the tip of the valve pin 68 and the surface of the molded part is avoided during removal or extraction of the part from the mold cavity 52. The actuators 80, 88 may be of any suitable type including pneumatic or hydraulic, for example. As well, the activation of the actuators may be controlled by electric actuation, magnetic actuation or a synchro plate to gang up on several valve pins together, for instance.

Use of the secondary actuator 88 and the intermediate closed position of the valve pin 68 is particularly desirable when the valve pin 68 is provided with a cylindrical tip (cylindrical gating), as this type of tip, when left in the mold gate 64 during removal or extraction of the part from the open mold is more likely to interfere with and damage the surface of the part. If, instead, the valve pin 68 is provided with an angled tip which is intended to conform more to the surface of the part and the contour of the opening formed in the mold gate 64, a secondary actuator 88 for and double-actuation of the valve pin 68 may not be required. However, an anti-rotation device or mechanism (not shown) would then be required to ensure that the valve pin 68 is properly oriented within the valve pin bushing 70 and nozzle tip 60 at all times during the molding operation, as the valve pin 68 would otherwise be prone to rotating within the valve pin bushing 70 which could then change the orientation of the angled tip causing it to damage or interfere with the part when the valve pin 68 is in the fully closed position. An example of a suitable anti-rotation device would be to have a portion of the valve pin 68 body formed with a square or rectangular cross-section (e.g., a key) which would fit within a corresponding square or rectangular opening in the valve pin bushing 70, for instance, thereby preventing the valve pin 68 from rotating while still allowing the valve pin to slidably move between the open and closed positions along axis 65. A flattened portion of the valve pin 68 body which would slide along a corresponding flattened surface would also suffice.

It will be understood that all components of the injection molding apparatus 10 described above are made of any suitable materials commonly used in injection molding devices. For instance, certain components may be made of conventional tool steel, stainless steel, or any other suitable material that is able to withstand changes in temperatures or thermal shock, which may occur as a result of the continuous cycling between extreme hot and cold temperatures.

Figure 6:
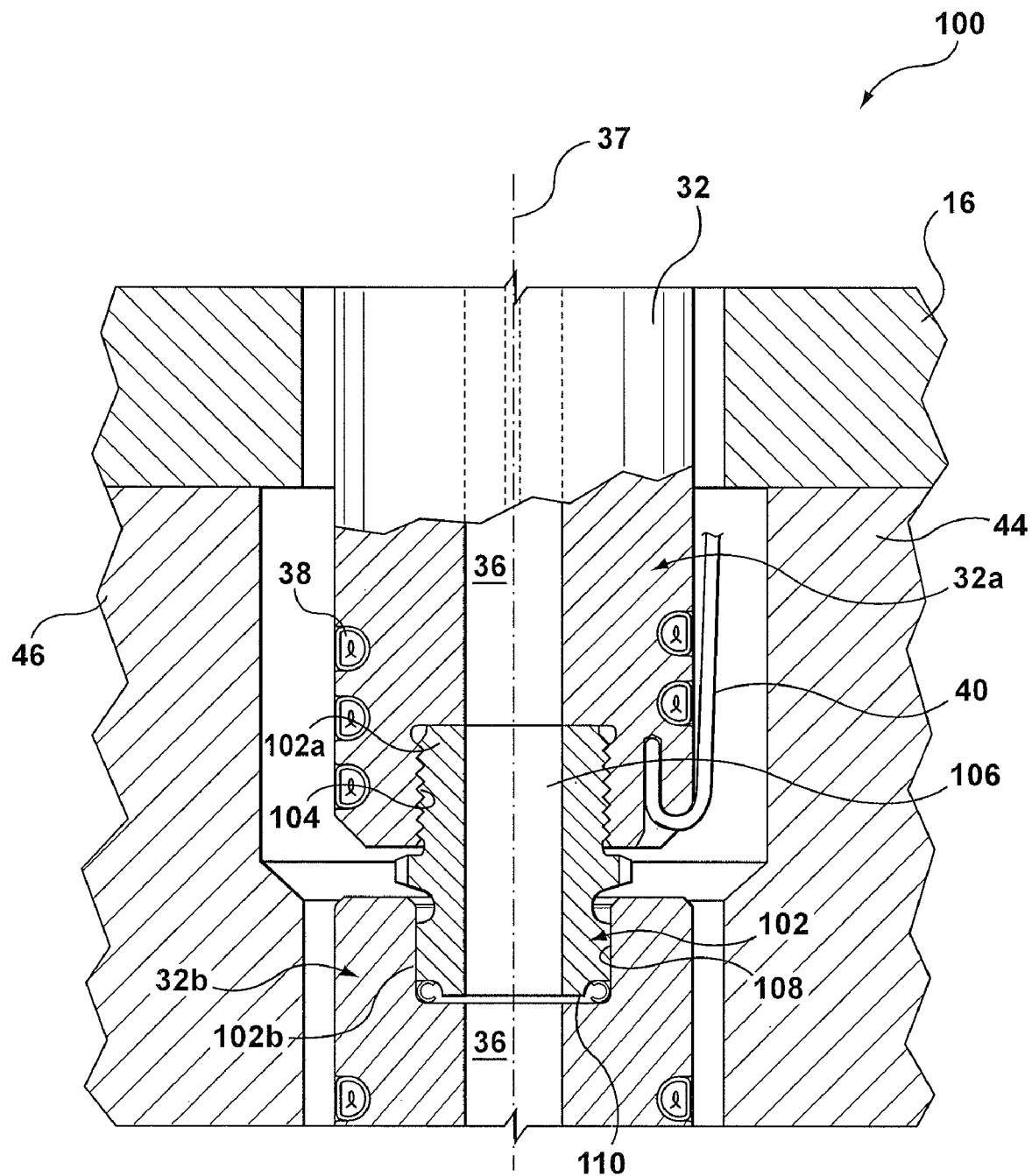
FIG. 6 is a partial cross-sectional view of a portion of an injection molding apparatus according to an alternate embodiment of the invention.

Referring now to FIG. 6, there is shown an alternate embodiment of an injection molding apparatus 100 according to the present invention. In this embodiment, the structure of the edge gate itself and valve pin 68 and actuation mechanism 82, 88 is unchanged. However, rather than having a floating manifold 12 as described above, a two-piece nozzle and melt disk configuration is used. In this embodiment, each nozzle body 32 is comprised of first and second portions 32a, 32b. First and second portions 32a, 32b are joined together by a nozzle insert 102. Nozzle insert 102 is coupled to the first portion 32a of the nozzle 32 at its first end 102a by means of a threaded connection 104 and has a channel 106 extending therethrough which aligns with and is in fluid communication with nozzle melt channel 36. The second end 102b of the nozzle insert is received in a corresponding opening 108 formed in the end of the second portion 32b of the nozzle body 32. The depth of the opening 108 is slightly greater than the length of the second end 102b of the nozzle insert 102, thereby forming a gap 110, which allows the second portion 32b of the nozzle 32 to expand upwards along axis 37. Therefore, thermal expansion of the nozzle 32 is provided for by the movement permitted between the second portion 32b of the nozzle 32 and the nozzle insert 102. In this type of configuration, the nozzle can be fixed at the gate and the manifold can be fixed as well.

Figure 7:
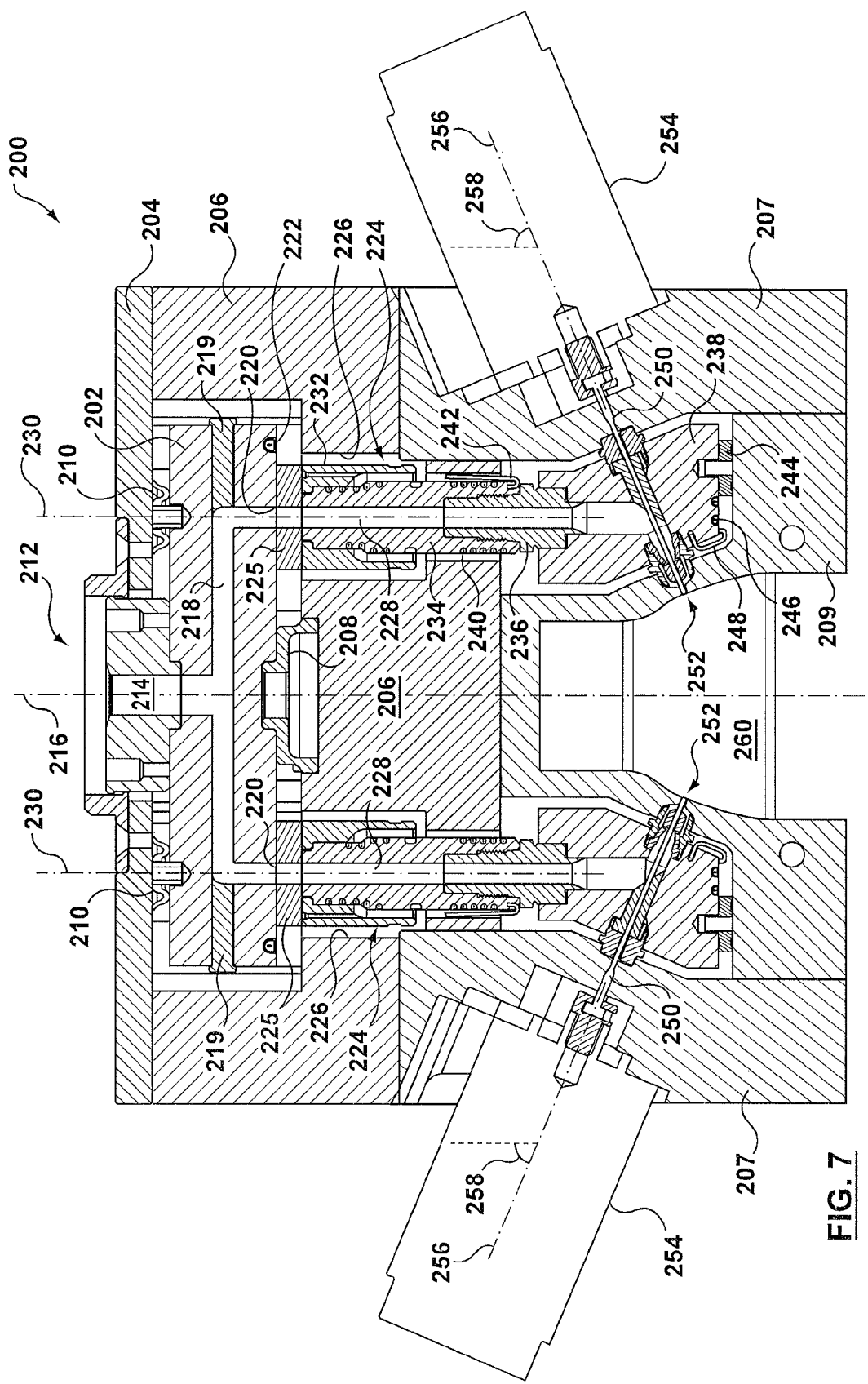
FIG. 7 is a partial cross-sectional view of a portion of an injection molding apparatus according to another embodiment of the present invention.

Referring to FIG. 7, there is shown another embodiment of an injection molding apparatus 200 according to the present invention. In the description of this embodiment, the other embodiments can be referenced for additional description of like parts. The features and aspects described for the other embodiments can be used accordingly with the present embodiment.

The injection molding apparatus 200 includes a manifold 202 which is spaced between a back plate 204 and a mold plate or plates 206. Further provided are side plates 207 and a cavity plate 209. In the present embodiment, the manifold 202 is located relative to the mold plates 206 by a locating ring 208, and is spaced apart from the back plate 204 by means of pressure disks 210.

A sprue bushing 212 receives a melt stream of moldable material from a machine nozzle (not shown) and delivers the melt through inlet 214, having a central axis 216, to a manifold melt channel 218. The melt travels through the melt channel 218 past plugs 219 and exits the manifold 202 through manifold outlets 220. The manifold 202 is heated by a manifold heater 222, such as an electrically resistive wire heater, which communicates with a power source (not shown) through electrical connectors (not shown).

Hot runner nozzles 224 are received in respective wells 226 defined by the mold plates 206, the side plates 207, and the cavity plate 209. While two nozzles 224 are shown, it will be understood that the injection molding apparatus 200 can be adapted so as to accommodate as many or as few nozzles 224 as desired, depending on the particular application. In this embodiment, each nozzle 224 is bolted, or otherwise fastened, to the manifold 202 with an optional spacer 225 located therebetween. A nozzle melt channel 228 extends through each nozzle 224 and is in fluid communication with the respective manifold outlet 220 to receive melt from the manifold 202. The nozzle melt channels 228 are aligned with a central axis 230 of the nozzle 224 that can be substantially parallel to the axis 216 of the inlet 214 of the sprue bushing 212. Each nozzle melt channel 228 has at least a portion that is aligned with the central axis 230. In this embodiment, the entire nozzle melt channel 228 is aligned with the central axis 230, so the central axis 230 is also the central axis of the nozzle melt channel 228 (as in the embodiment of FIGS. 1-5).

Each nozzle 224 includes a flange 232, an upper portion 234, a nozzle insert (also known as a nozzle link) 236, and a lower portion 238. The flange 232 is bolted to the manifold 202 and brazed to the upper portion 234, although other methods of connection, such as threading and welding, are also possible. The upper portion 234 has a helically wound embedded heater 240, such as an electrically resistive wire heater, which communicates with a power source (not shown) through electrical connectors (not shown). The upper portion 234 further has a temperature sensor 242, such as a thermocouple. The nozzle insert 236 is thread-connected or otherwise fixed to the upper portion 234 and slidably inserted into a bore of the lower portion 238. The lower portion 238 rests on the cavity plate 209 via a pressure disc 244. The lower portion 238 includes an embedded heater 246, such as an electrically resistive wire heater that communicates with a power source (not shown) through electrical connectors (not shown), and a temperature sensor 248, such as a thermocouple. When the nozzle 224 is heated or cools, the nozzle insert 236 slides relative to the lower portion 238 to accommodate the change in length of the nozzle 224. Thus, the manifold 202 and the lower portion 238 can be held fixed without impermissible stress or deformation. The nozzle heaters 240 and 246 are shown as being heating elements embedded in outer surfaces, however, any other suitable type of nozzle heater may be used. In addition, the heaters 240 and 246 can be operated on the same circuit or on separate circuits. In other embodiments, heater(s) and thermocouple(s) can be omitted or consolidated. Because the nozzle 224 has upper and lower portions 234, 238 and a nozzle insert 236 therebetween, the nozzle 224 can be termed a two-piece nozzle or melt disk configuration.

A valve pin 250 extends through the lower portion 238 of each nozzle 224 to control melt flow through a respective mold gate 252 of the cavity plate 209. The valve pins 250 are controlled by actuators 254 (such as electrical, pneumatic, hydraulic, or other type) that are mounted to the side plates 207. Each valve pin 250 is aligned with a central axis 256 that is at an angle 258 with respect to a line parallel to the central axis 230 of the respective nozzle melt channel 228. The angle 258 can be any value practical and depends, among other things, on the shape of the part to be molded and on the allowable overall dimensions of the injection molding apparatus 200. The angle 258 can have different values for different nozzles 224. If the required valve for the angle 258 is close to 0 degrees, a straight-gated system might be more practical, but this choice is left to a designer. In this embodiment, the angle 258 is about 67 degrees.

In operation, a cavity insert (not shown; e.g., ref. 56 of FIG. 1) is inserted into an opening 260 of the cavity plate 209 to define a mold cavity or cavities for the molded part or parts.

Figure 8:
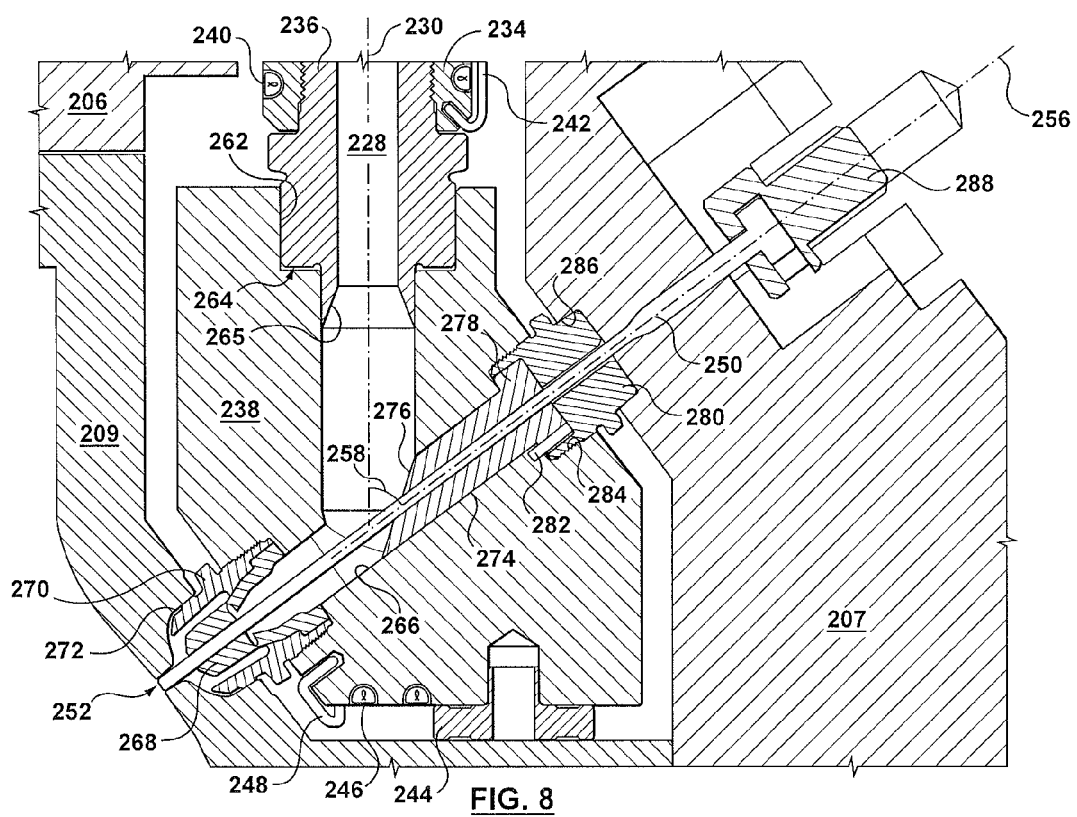
FIG. 8 is an enlarged view of a portion of FIG. 7.

Referring to FIG. 8, the nozzle insert 236 is inserted into a bore 262 of the lower portion 238 of the nozzle 224 and is slidable with respect to the lower portion 238. A gap 264 of any practical size is provided to allow for thermal expansion. The cold state is shown, and in the hot or operational state, the gap 264 will be smaller as the various components undergo thermal expansion. The nozzle insert 236 has an end 265 shaped with a gradually thinning wall to seal against melt leakage. When pressurized melt is present in the nozzle melt channel 228, the shape of the end 265 allows the end 265 to expand to seal against the bore 262. In other embodiments, the nozzle insert 236 can be flipped such that it is fixed (e.g., thread-connected) to the lower portion 238 and slidably connected to the upper portion 234.

The lower portion 238 of the nozzle 224 has an opening (bore) 266 extending therethrough along the central axis 256 and intersecting the nozzle melt channel 228, a portion of the opening 266 forming part of the nozzle melt channel 228 extending to the mold gate 252. A nozzle tip 268 and transfer seal or tip retainer 270, which includes a seal 272 for sealing against the cavity plate 209, are coupled to one end of the opening 266 of the lower portion 238 of the nozzle 224. In this embodiment, the tip retainer 270 removably secures the tip 268 to the lower portion 238 and aligns the tip 268 with respect to the mold gate 252. The nozzle tip 268 conducts melt and guides the valve pin 250 as described in the other embodiments. The nozzle tip 268 and tip retainer 270 may be coupled to the opening 266 in the lower portion 238 by any suitable method such as by means of a threaded connection (as shown) of the tip retainer 270 to the lower portion 238, or by brazing or soldering in other embodiments, for example. As well, while a two-part tip assembly (i.e., nozzle tip 268 and tip retainer 270) has been shown, it will be understood that any suitable tip assembly, such as a one-piece nozzle tip, may be used as desired.

A valve pin bushing 274 is provided in the opening 266 of the lower portion 238 at a location upstream (opposite) of the nozzle tip 268 and tip retainer 270. The valve pin bushing 274 is formed with an angled end portion 276 which sits within the opening 266 at the intersection with the nozzle melt channel 228 so as to provide a smooth transition as the melt flows from the nozzle melt channel 228 along the central axis 230 to the nozzle tip 268 and mold gate 252 along the central axis 256. The opposite end of the valve pin bushing 274 is formed with a head portion 278 which is held to the lower portion 238 by a nozzle locator piece 280. The valve pin bushing 274 is properly aligned in the opening 266 by way of a pin 282 extending through the head portion 278 and into a bore of the lower portion 238. The valve pin bushing 274 allows the valve pin 250 to slide and serves to guide the valve pin 250 and seal against leakage.

The nozzle locator piece 280 is threaded into a bore 284 of the lower portion 238 and contacts the head portion 278 of the valve pin bushing 274 to hold the valve pin bushing 274 in position. The nozzle locator piece 280 mates with a corresponding opening 286 formed in the side plate 207 and thereby works in conjunction with the tip retainer 270 to locate the lower portion 238 of the nozzle 224 with respect to the mold gate 252. The nozzle locator piece 280 also locates the side plate 207 with respect to the lower portion 238 to align the valve pin 250 with respect to the valve pin bushing 274 and the nozzle tip 268. The interconnection of locating diameters between the tip retainer 270 and the cavity plate 209, the interconnection of locating diameters between the nozzle locator piece 280 and the side plate 207, and the pressure disc 244 seating the lower portion 238 on the cavity plate 209 ensure that the lower portion 238 is held in place. Therefore, thermal expansion of the lower portion 238 occurs in the direction of the central axis 230 of the nozzle melt channel 228 towards the sprue bushing 212. Thermal expansion of the lower portion 238 in this direction is permitted as a result of the nozzle insert 236.

The valve pin 250 extends from a valve pin holder 288 connected to the actuator 254, through the opening 266 of the lower portion 238, and to the mold gate 252. The forward end of valve pin 250 extends through the nozzle tip 268 and tip retainer 270 to the mold gate 252. Depending upon the application or desired configuration, the tip of the valve pin 250 may be cylindrical or tapered. In addition, the valve pin 250 can have stepped diameters, as shown, or can be of a uniform diameter. Despite the fact that the angle 258 of the valve pin 250 with respect to the central axis 230 is not necessarily perpendicular to the flow of melt through the nozzle melt channel 228 (i.e., not 90 degrees as in the embodiment of FIGS. 1-5), this set-up can be referred to as an edge gate.

Regarding assembly and disassembly, in order to mate the nozzle locator piece 280 with the opening 286, the side plate 207 and other plates should be designed to allow movement of the side plate 207 along the central axis 256.

Figure 9:
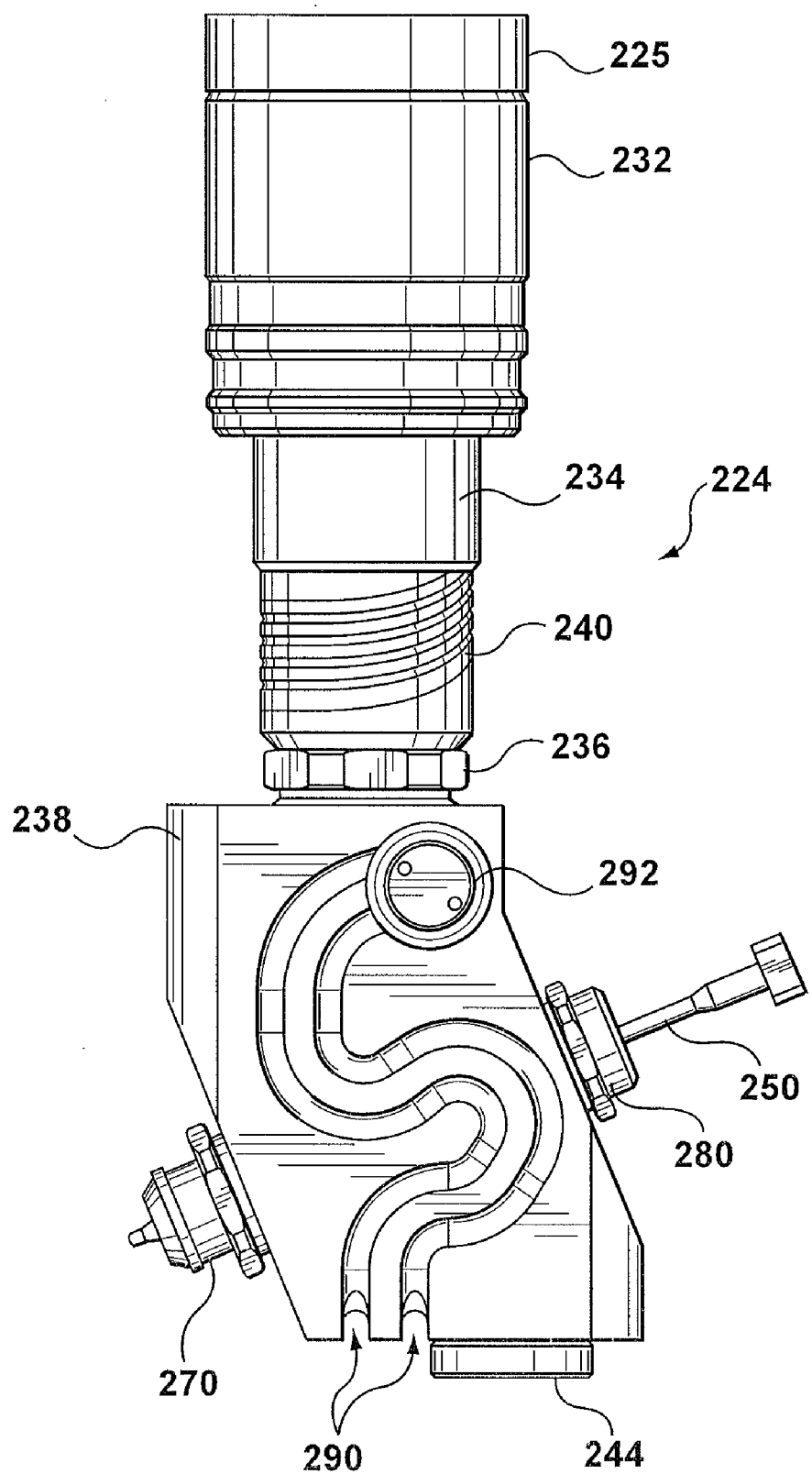
FIG. 9 is a side view of the nozzle of FIG. 7.

FIG. 9 shows a side view of the nozzle 224 and the spacer 225 removed from the injection molding apparatus 200. In this view, the heater 246 is not shown, thereby exposing a groove 290 in which the heater 246 is disposed. On the side not shown, the two legs of the groove 290 meet at a bend or loop-back. The layout of the groove 290 helps to ensure proper heating of the melt in the lower portion 238 and can have a path that best suits the shape and size of the lower portion 238 (e.g., the wandering path shown). Also shown in this view is a terminal end 292 through which the ends of the wire of the heater 246 extend for connection to a power source (not shown).

Figure 10:
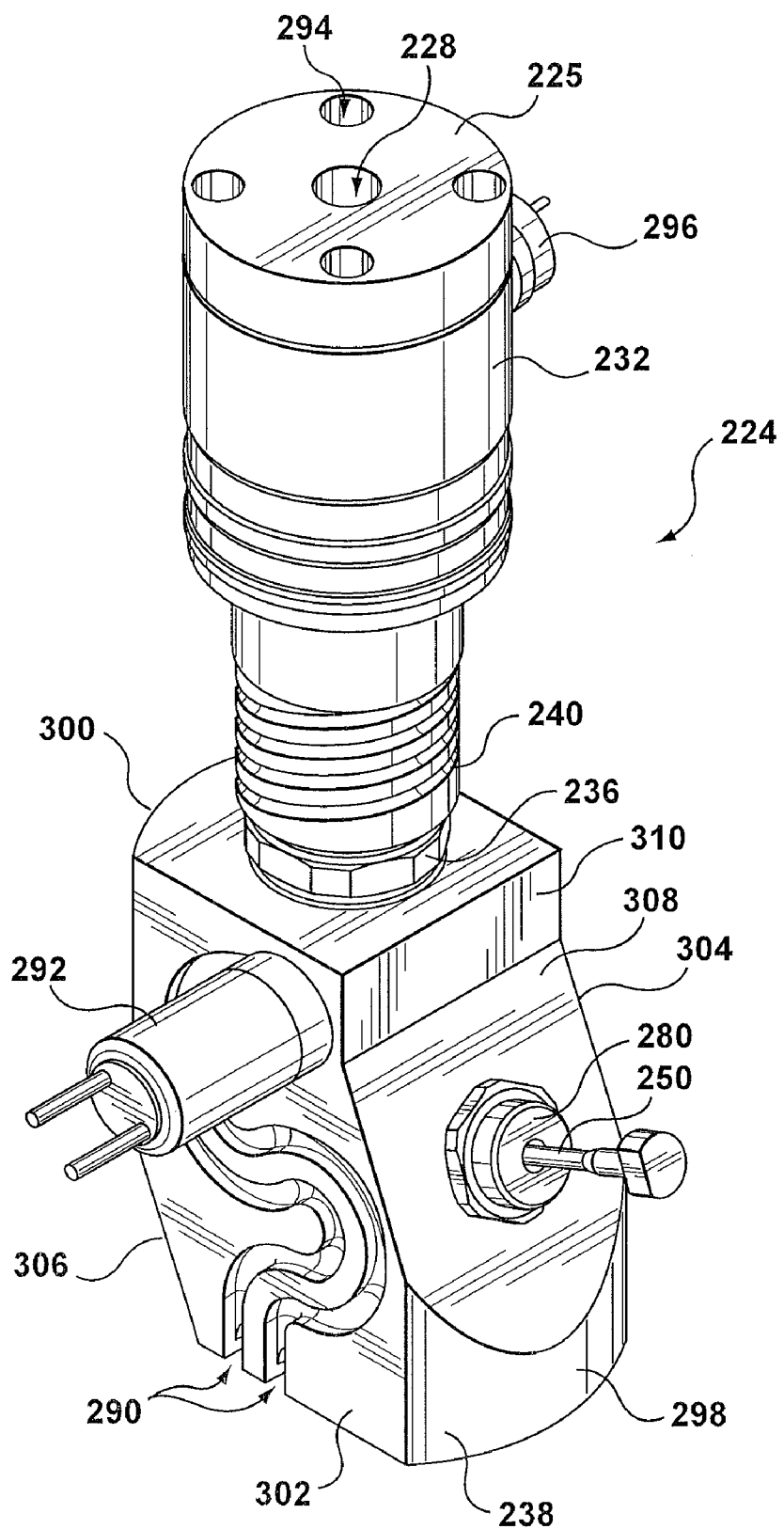
FIG. 10 is a perspective view of the nozzle of FIG. 7.

FIG. 10 shows a perspective view of the nozzle 224 and the spacer 225 removed from the injection molding apparatus 200. In this view, bolt holes 294 are visible in the spacer 225, and these extend into the nozzle 224 to secure the nozzle 224 to the manifold 202. A terminal end 296 for connecting the heater 240 to a power source (not shown) is also shown. The overall shape of the lower portion 238 is also illustrated. In this embodiment, the lower portion 238 is machined from a cylindrical blank. The curved surfaces 298 and 300 remain after machining flat surfaces 302-310. The flat surfaces 302 and 304 are opposite and allow a reduction in size of the lower portion 238 as well as a simplified base for machining the groove 290. The flat surfaces 306 and 308 are generally defined by the angle 258 of the valve pin 250. Naturally, other shapes are suitable for the lower portion 238.

Figure 11:
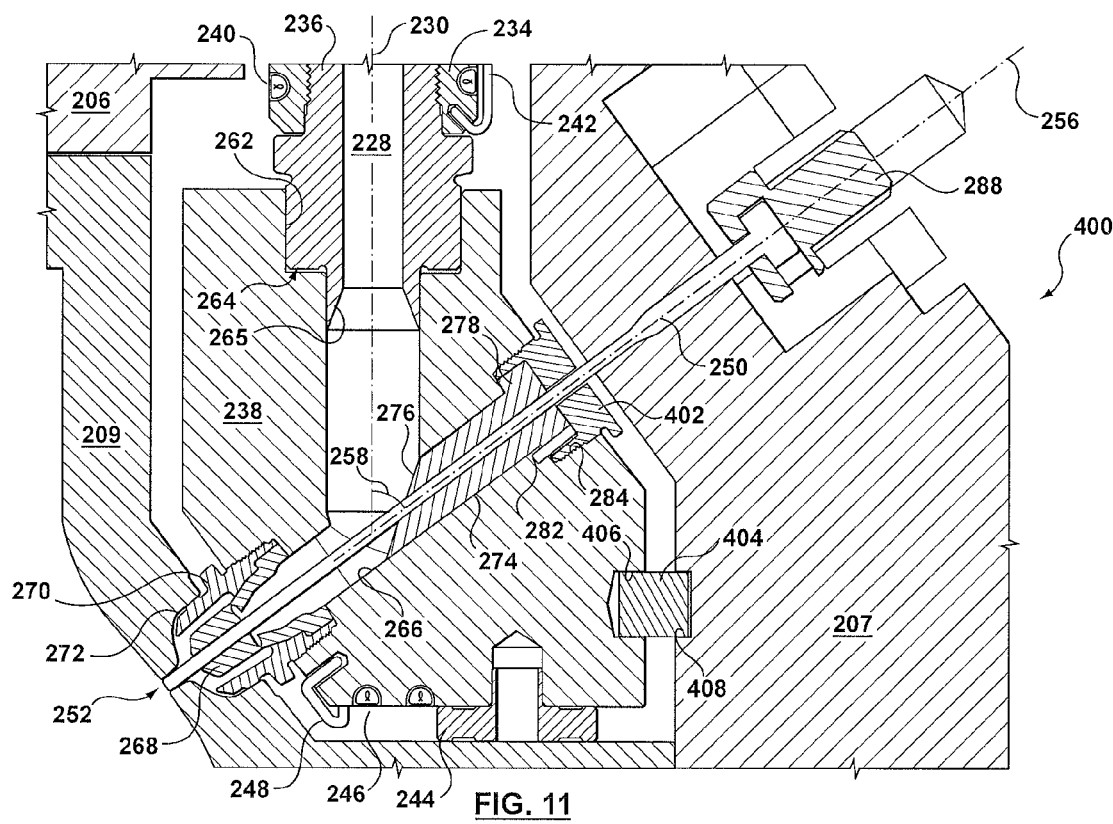
FIG. 11 is a cross-sectional view of a portion of an injection molding apparatus according to another embodiment of the present invention.

Referring to FIG. 11, there is shown another embodiment of an injection molding apparatus 400 according to the present invention. In the description of this embodiment, the other embodiments can be referenced for additional description of like parts. The features and aspects described for the other embodiments can be used accordingly with the present embodiment.

The injection molding apparatus 400 is similar to the injection molding apparatus 200. One difference is that the valve pin bushing 278 is held in place by a threaded cap 402, which does not contact the side plate 207. A nozzle locator piece 404 threads into a threaded bore 406 of the lower portion 238 of the nozzle 224 and mates with a smooth bore 408 of the side plate 207. The nozzle locator piece 404 serves the same locating functions as the nozzle locator pieces of the other embodiments. In other embodiments, the nozzle locator piece 404 can be flipped such that the threaded end and smooth ends, as well as the respective bores, are reversed.

It will be understood that all components of the injection molding apparatus described herein are made of any suitable materials commonly used in injection molding devices. For instance, certain components may be made of conventional tool steel, stainless steel, or any other suitable material that is able to withstand changes in temperatures or thermal shock, which may occur as a result of the continuous cycling between extreme hot and cold temperatures.

In yet another embodiment, the two-piece nozzle or melt disk configuration described above may also used in conjunction with a floating manifold 12. In such an embodiment, the second portion 32b of the nozzle 32 is movable with respect to the nozzle insert 102 as described above, and the first portion 32a of the nozzle 32 can also expand causing the floating manifold 12 to compress the pressure disks 18 against the back plate 14. Accordingly, it will be understood that many embodiments may be used, all of which provide for expansion of the nozzle body 32 in the direction of the primary axes, such as axis 24 or axis 37, of the injection molding apparatus 10, 100.

Figure 12:
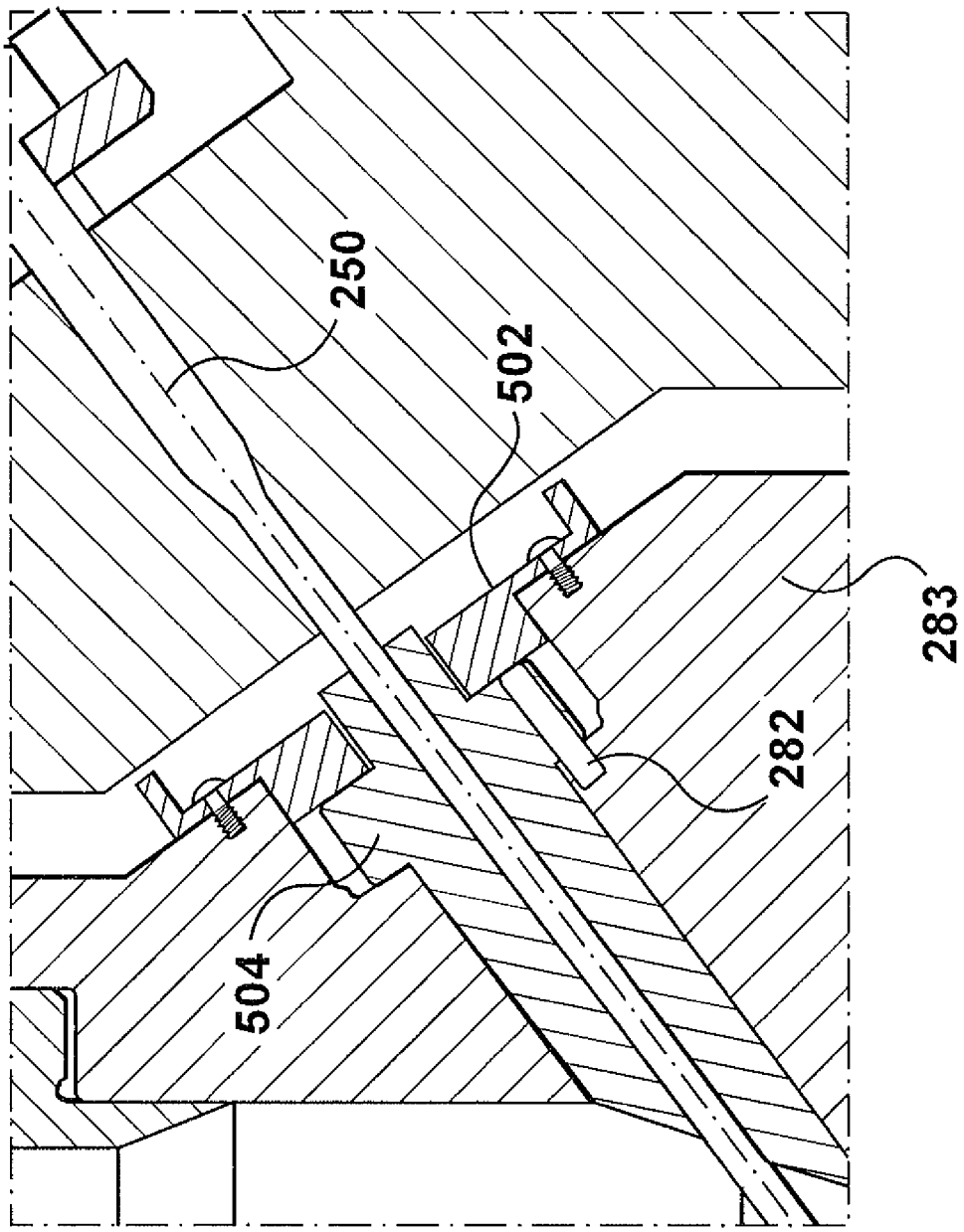
FIG. 12 is a cross-sectional view showing another valve pin bushing according to the present invention.

Referring to FIG. 12, there is shown a partial view of another embodiment of an injection molding apparatus according to the present invention. In the description of this embodiment, the other embodiments can be referenced for additional description of like parts. The features and aspects described for the other embodiments can be used accordingly with the present embodiment.

In this embodiment, a valve pin bushing 504 is held in place by a bolted cap 502, which does not contact the side plate 207. The cap 502 is removably held to the lower portion 238 of the nozzle 224 by bolts. The valve pin bushing 504 has a narrowed rear portion that extends through the opening in the cap 502.

Having described a preferred embodiment of the invention and certain variations, it will be appreciated that various modifications may be made to the structures described without departing from the spirit or scope of the invention described herein.

What is claimed is:

1. An injection molding apparatus, comprising:
   a manifold having a manifold melt channel for receiving a melt stream of moldable material under pressure;
   at least one nozzle having a nozzle melt channel in fluid communication with the manifold melt channel for receiving the melt stream from the manifold, the nozzle having a central axis; the nozzle having an opening that intersects with the nozzle melt channel, the opening having a central axis that is at an angle with respect to the central axis of the nozzle;
   a nozzle tip coupled to the nozzle at one end of the opening;
   a valve pin bushing coupled to the nozzle at an end of the opening opposite the nozzle tip;
   a valve pin extending through the opening and slidable within the valve pin bushing to open and close a mold gate;
   a primary actuator connected to the valve pin to open and close the mold gate; and
   a nozzle locator piece connected to the nozzle for mating with a side plate to locate the nozzle with respect to the mold gate.

2. The injection molding apparatus of claim 1 further comprising a tip retainer holding the nozzle tip to the nozzle and locating the nozzle with respect to the mold gate.

3. The injection molding apparatus of claim 1, wherein the nozzle locator piece contacts the valve pin bushing to hold the valve pin bushing to the nozzle.

4. The injection molding apparatus of claim 1, wherein the nozzle locator piece is threaded to the nozzle.

5. The injection molding apparatus of claim 1, wherein the nozzle locator piece does not contact the valve pin bushing.

6. The injection molding apparatus of claim 1, wherein the valve pin bushing is held in place by a cap.

7. The injection molding apparatus of claim 6, wherein the cap does not contact the side plate.

8. The injection molding apparatus of claim 1 further comprising a pressure disc for seating the nozzle on a cavity plate.

9. The injection molding apparatus of claim 1, wherein the nozzle comprises upper and lower portions joined by a nozzle insert that is fixed to one of the upper and lower portions and slidable with respect to the other of the upper and lower portions.

10. The injection molding apparatus of claim 9, wherein the lower portion comprises a heater disposed in a groove.

11. The injection molding apparatus of claim 10, wherein the lower portion further comprises a terminal end through which wires of the heater extend for connection to a power source.

12. The injection molding apparatus of claim 1 further comprising a secondary actuator for moving the valve pin to an intermediate closed position.

13. An injection molding apparatus, comprising:
   a manifold having a manifold melt channel for receiving a melt stream of moldable material under pressure;
   a nozzle having a nozzle melt channel in fluid communication with the manifold melt channel for receiving the melt stream from the manifold, the nozzle having a central axis oriented in a first direction; the nozzle having a transverse opening formed through a front end thereof and intersecting the nozzle melt channel, the transverse opening having a central axis oriented in a second direction, the second direction being substantially perpendicular to the first direction;
   a nozzle tip coupled to one end of the transverse opening, the nozzle tip having a tip melt channel extending therethrough in substantially said second direction, the tip melt channel being in fluid communication with the nozzle melt channel for receiving the melt stream;
   a valve pin slidable within the transverse opening and the tip melt channel in an actuation direction coaxial with the central axis of said transverse opening between open and closed positions; and a primary actuator laterally spaced from said nozzle, said primary actuator operatively engaging the valve pin so as to move the valve pin between said closed and open positions.

14. An injection molding apparatus of claim 13 further comprising a nozzle locator piece connected to the nozzle for mating with a side plate to locate the nozzle with respect to a mold gate.

15. The injection molding apparatus of claim 14 further comprising a valve pin bushing coupled to the nozzle at an end of the transverse opening opposite the nozzle tip, the valve pin slidable within the valve pin bushing, the nozzle locator piece contacting the valve pin bushing to hold the valve pin bushing to the nozzle.

16. The injection molding apparatus of claim 13 further comprising a tip retainer holding the nozzle tip to the nozzle and locating the nozzle with respect to the mold gate.

17. An injection molding apparatus, comprising:

a manifold having a manifold melt channel for receiving a melt stream of moldable material under pressure;

a nozzle having a nozzle melt channel in fluid communication with the manifold melt channel for receiving the melt stream from the manifold, the nozzle having a central axis oriented in a first direction; the nozzle having a transverse opening formed through a front end thereof and intersecting the nozzle melt channel, the transverse opening having a central axis oriented in a second direction, the second direction being at an angle to the first direction;

a nozzle tip coupled to one end of the transverse opening, the nozzle tip having a tip melt channel extending therethrough in substantially said second direction, the tip melt channel being in fluid communication with the nozzle melt channel for receiving the melt stream; a tip retainer holding the nozzle tip to the nozzle body;

a mold cavity in fluid communication with the tip melt channel for receiving the melt stream through a mold gate;

a valve pin slidable within the transverse opening and tip melt channel from a closed position in which a tip of the valve pin closes the mold gate preventing flow of the melt stream from the nozzle melt channel therethrough to a retracted open position in which the tip is retracted out of the mold gate to a position such that fluid communication between the nozzle melt channel and mold gate is established;

a valve pin bushing positioned in the transverse opening of the nozzle opposite to the nozzle tip, the valve pin bushing being adapted to slidably receive the valve pin and having an end shaped to direct the melt stream from the nozzle melt channel to the tip melt channel; and a primary actuator laterally spaced from said nozzle, said primary actuator operatively engaging the valve pin so as to move the valve pin between said closed and open positions;

wherein the tip retainer and valve pin bushing locate the nozzle with respect to the mold gate, and thermal expansion of said nozzle is permissible in said first direction, said manifold being movable with said nozzle in said first direction within said injection molding apparatus.

18. The injection molding apparatus of claim 17 further comprising a pressure disc disposed between the nozzle and a cavity plate for seating the nozzle on the cavity plate.

19. The injection molding apparatus of claim 17, wherein the nozzle comprises upper and lower portions joined by a nozzle insert that is fixed to one of the upper and lower portions and slidable with respect to the other of the upper and lower portions.

20. The injection molding apparatus of claim 19, wherein the lower portion comprises a heater disposed in a groove.

* * * * *